US011890654B2

(12) United States Patent
De Lorenzo et al.

(10) Patent No.: US 11,890,654 B2
(45) Date of Patent: Feb. 6, 2024

(54) SYSTEM AND METHOD OF CLEANING FIRED HEATER COILS

(71) Applicant: Quest Integrity Group, LLC, Sugar Land, TX (US)

(72) Inventors: Robert Victor De Lorenzo, Sugar Land, TX (US); Philipp Mayer, Sugar Land, TX (US); Arie Jacobus Van Toor, Sugar Land, TX (US); Benjamin David Van Veen, Sugar Land, TX (US); Timothy Haugen, Sugar Land, TX (US)

(73) Assignee: Quest Integrity Group, LLC, Stafford, TX (US)

( * ) Notice: Subject to any disclaimer, the term of this patent is extended or adjusted under 35 U.S.C. 154(b) by 658 days.

(21) Appl. No.: 17/058,088

(22) PCT Filed: May 24, 2019

(86) PCT No.: PCT/US2019/034021
§ 371 (c)(1),
(2) Date: Nov. 23, 2020

(87) PCT Pub. No.: WO2019/227058
PCT Pub. Date: Nov. 28, 2019

(65) Prior Publication Data

US 2021/0213493 A1 Jul. 15, 2021

Related U.S. Application Data

(60) Provisional application No. 62/676,355, filed on May 25, 2018.

(51) Int. Cl.
*B08B 9/04* (2006.01)
*B08B 9/043* (2006.01)
*B08B 13/00* (2006.01)

(52) U.S. Cl.
CPC ............ *B08B 9/0436* (2013.01); *B08B 13/00* (2013.01); *B08B 2209/04* (2013.01)

(58) Field of Classification Search
CPC ..... G01M 3/005; G01M 3/246; B08B 9/0551; B08B 9/0557; B08B 2209/04; B08B 13/00; B08B 9/0436; F16L 2101/30; F16L 55/26

(Continued)

(56) References Cited

U.S. PATENT DOCUMENTS 2,015,567 A 9/1935 Lowry
6,569,255 B2 5/2003 Sivacoe
(Continued)

FOREIGN PATENT DOCUMENTS

EP 2039440 A1 3/2009
JP 4407610 B2 2/2010
(Continued)

OTHER PUBLICATIONS

Extended European Search Report in related application EP19807001 dated Jan. 27, 2022.
(Continued)

*Primary Examiner* — Katina N. Henson
(74) *Attorney, Agent, or Firm* — Patterson + Sheridan, LLP

(57) ABSTRACT

A system and method for cleaning coils in a fired heater is provided. The cleaning system includes a data acquisition tool configured to pass through the coils to acquire data. The cleaning system is configured to establish a pre-cleaning fouling baseline derived from the data for the coils. The cleaning system is configured to develop an optimized cleaning plan for the coils based on the pre-cleaning fouling baseline. The optimized cleaning plan includes a focused cleaning for a fouling area in the coils. The cleaning system
(Continued)

further includes at least one cleaning pig configured to clean the coils based on the optimized cleaning plan. The cleaning system further includes a decoking truck for cleaning the coils with the cleaning pig based on the optimized cleaning plan.

20 Claims, 11 Drawing Sheets

(58) Field of Classification Search
USPC ............... 15/104.061, 104.05; 134/22.1, 8, 6
See application file for complete search history.

(56) References Cited

U.S. PATENT DOCUMENTS

| | | | | |
|---|---|---|---|---|
| 7,670,462 | B2 | 3/2010 | Gibson et al. | |
| 8,491,722 | B2 | 7/2013 | Phipps | |
| 8,894,772 | B2 * | 11/2014 | Phipps | F16L 55/26 134/22.12 |
| 2002/0011124 | A1 | 1/2002 | Phipps | |
| 2009/0078283 | A1 * | 3/2009 | Phipps | B08B 9/0557 134/8 |
| 2009/0235730 | A1 | 9/2009 | Alapati | |
| 2013/0276828 | A1 | 10/2013 | Phipps et al. | |
| 2016/0354814 | A1 | 12/2016 | Carson | |

FOREIGN PATENT DOCUMENTS

| | | | |
|---|---|---|---|
| WO | 2001076780 | A1 | 10/2001 |
| WO | PCT/US19/34021 | | 8/2019 |

OTHER PUBLICATIONS

Fouling Verification Service, Challenge Convention, Mar. 31, 2016.
FTIS Fouling Verification, Challenge Convention, Oct. 17, 2016.
Quotation for cleanliness verification & FTIS inspection of the BR-104, Feb. 14, 2017.
International Search Report and Written Opinion in related application PCT/US2019/034021 dated Aug. 16, 2019.

* cited by examiner

SYSTEM AND METHOD OF CLEANING FIRED HEATER COILS

CROSS-REFERENCE TO RELATED APPLICATIONS

This application is a National Phase filing under 35 U.S.C. § 371 of International Application PCT/US2019/034021, filed on May 24, 2019, which claims priority to U.S. Provisional Patent Application Ser. No. 62/676,355, filed May 25, 2018, entitled "SYSTEM AND METHOD OF CLEANING FIRED HEATER COILS," both of which are incorporated herein by reference in their entirety for all purposes.

FIELD OF DISCLOSURE

In general, the disclosure describes a system and methodology used to optimally clean coils, tubes, pipes, and the like, within a fired heater that are commonly used within the power and oil and gas industries.

BACKGROUND

Fired heaters are used in industries such as power and oil and gas. Fired heaters are typically insulated enclosures that use heat created by the combustion of fuels to heat fluids contained within coils, tubes, pipes, or the like. The type of fired heater is generally described by the structural configuration, the radiant tube coil configuration and the burner arrangement.

Example structural configurations of fired heaters include, but are not limited to, cylindrical, box, cabin and multi-cell. Example radiant-tube coil configurations include, but are not limited to, vertical, horizontal, helical, and arbor. Examples of burner arrangements include, but are not limited to, up-fired, down-fired, and wall-fired. Example configurations of fired heaters, and the components therein, can be found in API560.

Over time, the internal coils, tubes, pipes or the like (collectively the "coils") of the fired heater become internally fouled with coke. Coke is ash made of carbon fragments that lays down and coats the interior of the coils. Coke deposits drop out of the process stream if/when the stream gets too hot and starts to thermally degrade. Decoking is the industry term used to describe the process of removing coke or other types of internal fouling from a fired heater's inner coils.

Presently, decoking is done by cleaning pipes/tubes/coils until no "black water" comes out of the furnace. As known in the art, cleaning pigs are run through the coils to decoke the internal surfaces. Such process of cleaning coils with cleaning pigs is generally referred to as pigging. Cleaning pigs are exchanged when they are not effective anymore (worn out), indicated by the pressure graph or the color of the water coming back. In some cases, the location of the fouling can be roughly estimated using a pressure graph. This process has no measurable guarantee of its effectiveness and is heavily dependent on the experience of the decoking operator.

What is needed, is a more efficient, more effective method and system that addresses the issues with conventional cleaning by providing the operator with accurate information on the location of the internal process to enable process optimization.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

Another embodiment of the present disclosure provides a method for cleaning coils in a fired heater including sending a data acquisition tool through the coils to acquire data and establishing a pre-cleaning fouling baseline derived from the data. Establishing the pre-cleaning fouling baseline includes identifying at least one fouling area and establishing a location in the coils for the at least one fouling area. The method for cleaning coils further includes developing an optimized cleaning plan for the coils based on the pre-cleaning fouling baseline. The optimized cleaning plan comprises a focused cleaning for the at least one fouling area. The method for cleaning coils further includes cleaning the coils based on the optimized cleaning plan with at least one cleaning pig. The cleaning includes driving the at least one cleaning pig through the coils and performing the focused cleaning on the at least one fouling area with the at least one cleaning pig. The cleaning further includes monitoring the location of the at least one cleaning pig within the coils of the fired heater in real-time.

Another embodiment of the present disclosure provides a cleaning system for cleaning coils in a fired heater. The cleaning system including a data acquisition tool configured to pass through the coils to acquire data. The cleaning system is configured to establish a pre-cleaning fouling baseline derived from the data for the coils. Establishing the pre-cleaning fouling baseline includes identifying at least one fouling area and establishing a location in the coils for the at least one fouling area. The cleaning system is configured to develop an optimized cleaning plan for the coils based on the pre-cleaning fouling baseline. The optimized cleaning plan includes a focused cleaning for the at least one fouling area. The cleaning system further includes at least one cleaning pig configured to clean the coils based on the optimized cleaning plan. The cleaning system further includes a decoking truck for cleaning the coils based on the optimized cleaning and configured to drive the at least one cleaning pig through the coils to perform the focused cleaning on the at least one fouling area with the at least one cleaning pig, and to monitor the location of the at least one cleaning pig within the coils of the fired heater in in real-time.

Another embodiment of the present disclosure provides a method for cleaning coils in a fired heater in a cleaning operation. The method for cleaning coils includes locating a decoking truck on-site with the fired heater to perform the cleaning operation. The method for cleaning coils further includes coupling the decoking truck to the coils of the fired heater, sending a data acquisition tool through the coils to acquire data, and establishing a pre-cleaning fouling baseline derived from the data. Establishing the pre-cleaning fouling baseline includes identifying at least one fouling area and establishing a location in the coils for the at least one fouling area. The method for cleaning coils further includes developing an optimized cleaning plan for the coils based on the pre-cleaning fouling baseline. The optimized cleaning plan includes s a focused cleaning for the at least one fouling area. The method for cleaning coils further includes cleaning the coils based on the optimized cleaning plan with at least one cleaning pig. The cleaning the coils based on the optimized cleaning plan includes driving the at least one cleaning pig through the coils with the decoking truck, performing the focused cleaning on the at least one fouling area with the at least one cleaning pig, and monitoring with the decoking truck the location of the at least one cleaning pig within the coils of the fired heater in real-time.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of the various technologies described herein, and:

FIG. 4-1 provides example data from a decoking truck at the beginning of cleaning coils of a fired heater of an embodiment of the present disclosure;

FIG. 4-2 provides example data from the decoking truck after cleaning coils of the fired heater of an embodiment of the present disclosure;

FIGS. 8-1 to 8-5 illustrates a sequence of stages during a cleaning operation in an embodiment of the present disclosure;

DETAILED DESCRIPTION

Figure 1:
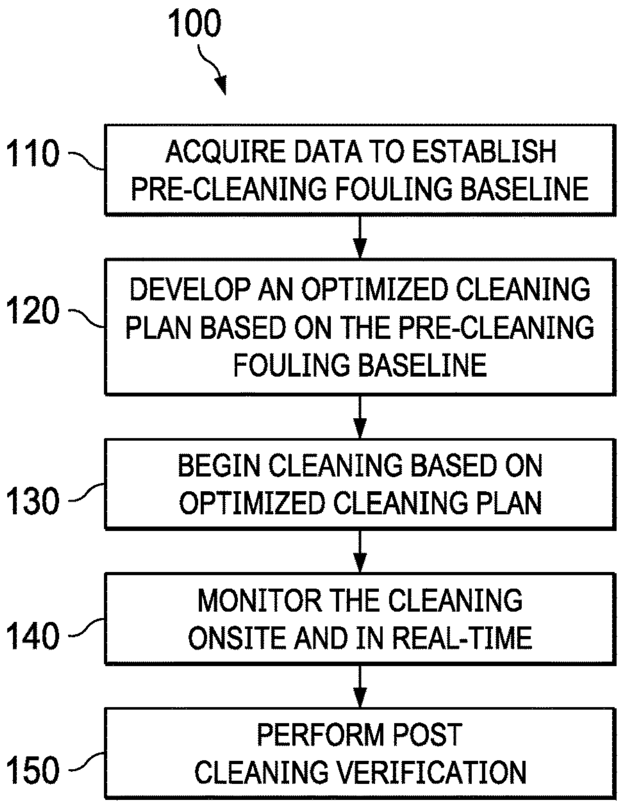
FIG. 1 is an illustration of an embodiment of a cleaning method of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms “connect”, “connection”, “connected”, “in connection with”, and “connecting” are used to mean “in direct connection with” or “in connection with via one or more elements”; and the term “set” is used to mean “one element” or “more than one element”. Further, the terms “couple”, “coupling”, “coupled”, “coupled together”, and “coupled with” are used to mean “directly coupled together” or “coupled together via one or more elements”. As used herein, the terms “up” and “down”; “upper” and “lower”; “top” and “bottom”; and other like terms indicating relative positions to a given point or element are utilized to more clearly describe some elements. As used herein, the terms “coils”, “pipes”, and “tubes” are used individually or in combination to mean the internal fluid carrying elements of a fired heater.

The disclosure generally relates to a system and methodology used to optimally clean coils, tubes, pipes, and the like, within fired heaters that are commonly used within the power and oil and gas industries. Embodiments of the present disclosure provide the operator with accurate information identifying the location of the internal fouling as well as giving the operator insight into the effectiveness of the cleaning process. Embodiments of the present disclosure make the entire cleaning process more effective; the cleanliness of the cleaning process is qualified, and the cleaning process is easier to implement for a less experienced operator, making for a more effective job.

FIG. 1 illustrates an embodiment of the method of the present disclosure. As shown, the cleaning method, referred to generally as 100, first acquires data to establish a pre-cleaning fouling baseline (step 110). The data acquired to establish the pre-cleaning fouling baseline may be referred to as pre-cleaning baseline data. The optimized cleaning plan is next developed based on the pre-cleaning fouling baseline (step 120). The cleaning is next begun based on the optimized cleaning plan (step 130). The cleaning is monitored onsite and in real-time (step 140), and finally a post cleaning verification is performed (step 150).

The pre-cleaning fouling baseline (step 110) and the optimized cleaning plan (step 120) are derived from the baseline data and are established to identify where concentrations of fouling are located in a coil prior to decoking and to help focus cleaning efforts in those areas with fouling instead of the entire coil. Focused cleaning can be referred to also as targeted cleaning. This cleaning methodology 100 will reduce wear and tear on the coils from over cleaning and reduce overall decoking times, which in turn will reduce unit downtime and lost profits. Mapping the initial fouling locations is also important information for asset owners, as it may help them gain insights into their refining process, enabling them to adjust their process procedures to optimize asset efficiency.

In embodiments of the present disclosure, the baseline data is collected by sending a data acquisition tool, as such tools are generally known in the art, through the fired heaters coils. As discussed previously, the coils may also be referred to as pipes or tubes. This data is used to locate and quantify the remaining areas of internal fouling, (typically coke). Once areas of internal fouling, also referred to as fouling areas, are identified, cleaning commences (step 130).

In embodiments of the present disclosure, the cleaning is done using cleaning (decoking) pigs. Cleaning pigs are generally known in the art and examples are provided in FIG. 2 and are identified generally with reference number 220. Embodiments of cleaning pig 220, also commonly referred to as a decoking pig or scraper pig have an abrasive outer surface to enable the cleaning of the coils. Both cleaning pig 220-1 and cleaning pig 220-2 have an abrasive outer surface 222 that includes studs extending outwards, sometimes referred to as protrusions, as part of the abrasive surface 222. In some embodiments, the studs are made of metal. In other embodiments, the studs are made of non-metallic materials. The cleaning pigs 220 having the abrasive outer surface 222 are configured to scrape internal fouling, such as coke, from the coils. Tracer pigs are generally known in the art and an example is provided in FIG. 2 and is identified generally with reference number 280. In some embodiments, tracer pigs 280 may have relatively smooth outer surfaces compared to cleaning pigs 220.

The monitoring of the cleaning process (step 140) is performed by monitoring the location of the cleaning pigs through use of a "smart" decoking truck, as will be described in more detail below. An embodiment of the decoking truck of the present disclosure is enabled with pumps to drive the cleaning pigs through the coils and instruments that monitor flow, pressure, temperature, speed, and other factors of the fluid used to drive a cleaning pig through a fired heater. The decoking truck is located onsite and provides real-time monitoring of the cleaning process. It should be understood that in alternate embodiments, the decoking truck may be any type of vehicle or mobile asset capable of providing the onsite, real-time monitoring of the cleaning process.

The final step of the cleaning method 100 of the present disclosure is the post cleaning verification (step 150). This step can be performed by inspection tools known in the art to determine the effectiveness of the cleaning.

Figure 3:
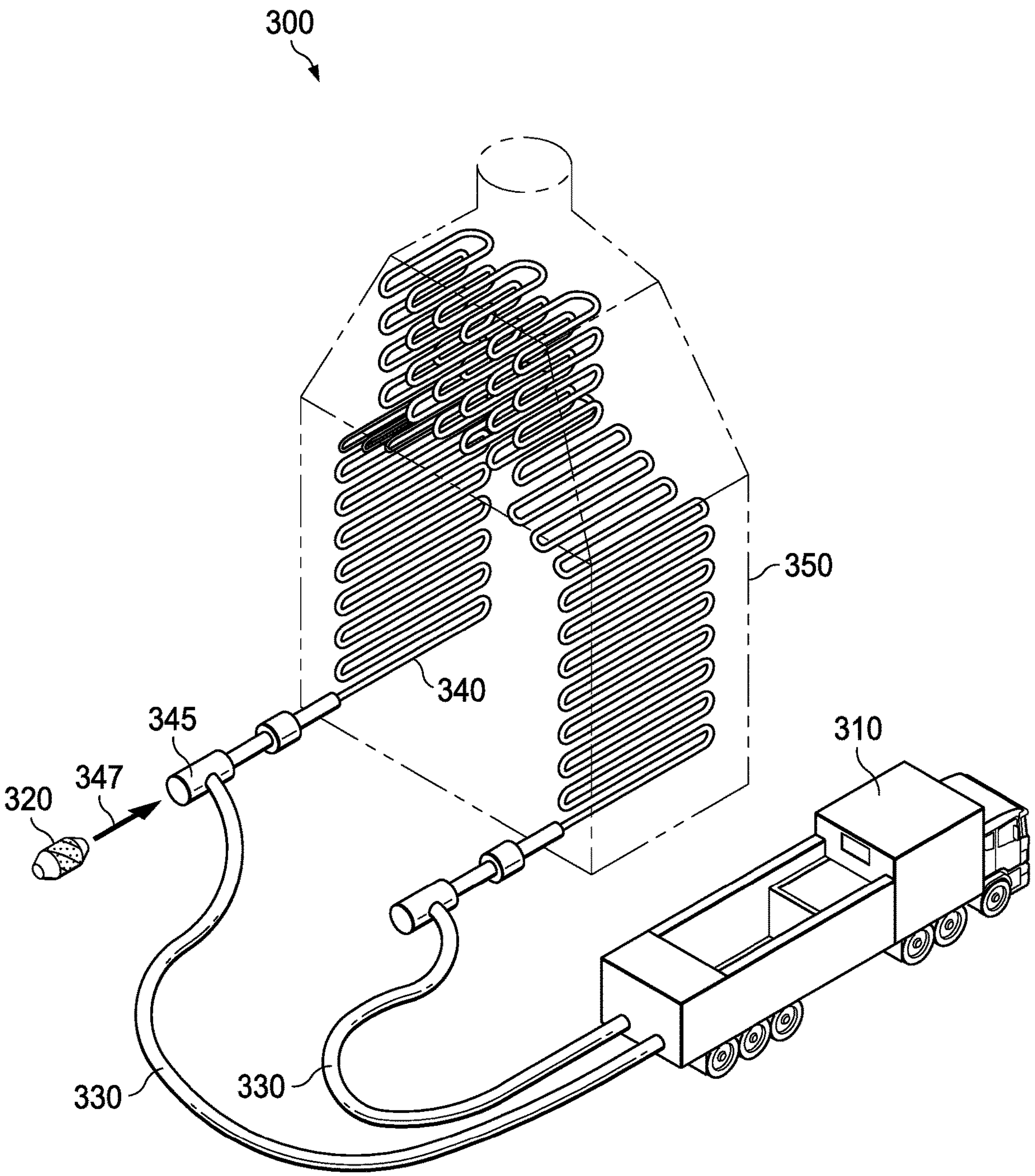
FIG. 3 is an illustration of an embodiment of a cleaning system of the present disclosure.

FIG. 3 shows a schematic of an embodiment of the cleaning system, referred to generally as 300, of the present disclosure. As shown, the cleaning system 300 comprises the "smart" decoking truck 310, a cleaning pig 320, and fluid conduits 330 creating one or more flow paths between the decoking truck 310 and the coils 340, also referred to as pipes and tubes, of the fired heater 350. The fluid conduits 330 enable the smart decoking truck 310 to both pump the cleaning pig 320 and monitor the performance and location of the cleaning pig 320. It should be understood that the cleaning pig 320 may be inserted into a permanent or temporary pig receiver 345 providing access to the coils 340 of the fired heater 350. An arrow 347 illustrates that the cleaning pig 320 may be inserted into the pig receiver 345. The cleaning system 300 further includes a data acquisition tool 886 shown in FIG. 8-3. The data acquisition tool 886 collects data used to locate and quantify internal fouling of the coils 340. This data may be referred to as pre-cleaning fouling data.

An embodiment of the "smart" decoking truck 310 of the present disclosure provides instrumentation to record critical parameters (flow, pressure, etc.) and evaluate this data to determine the location of the cleaning pig 320 in the fired heater 350 throughout the cleaning process. Knowing the location of the cleaning pig 320 in the coil 340 is essential to embodiments of the present disclosure, as it prevents the operator from cleaning in areas where no fouling is present, thereby preventing pipe metal loss due to the aggressive mechanical nature of the cleaning pigs 320. Furthermore, the decoking truck 310 instrumentation data enables the operator to know when a cleaning pig 320 is no longer effective and needs to be replaced. This influences the efficiency of the decoking process and thereby, reduces time-on-site.

The decoking truck 310 of the present disclosure uses state of the art pressure and flow sensors to display and analyze the cleaning process data. The truck 310 has a built-in choke valve to regulate the flow down to one gal/min (3.79 liters/min). The truck 310 analyzes the cleaning process data in real time. This way the number of cleaning runs is calculated automatically and other features such as cleaning pig 320 localization and effectiveness can be both qualified and quantified. The decoking truck 310 of the present disclosure digitally records data to determine the location of the cleaning pigs 320.

Figure 2:
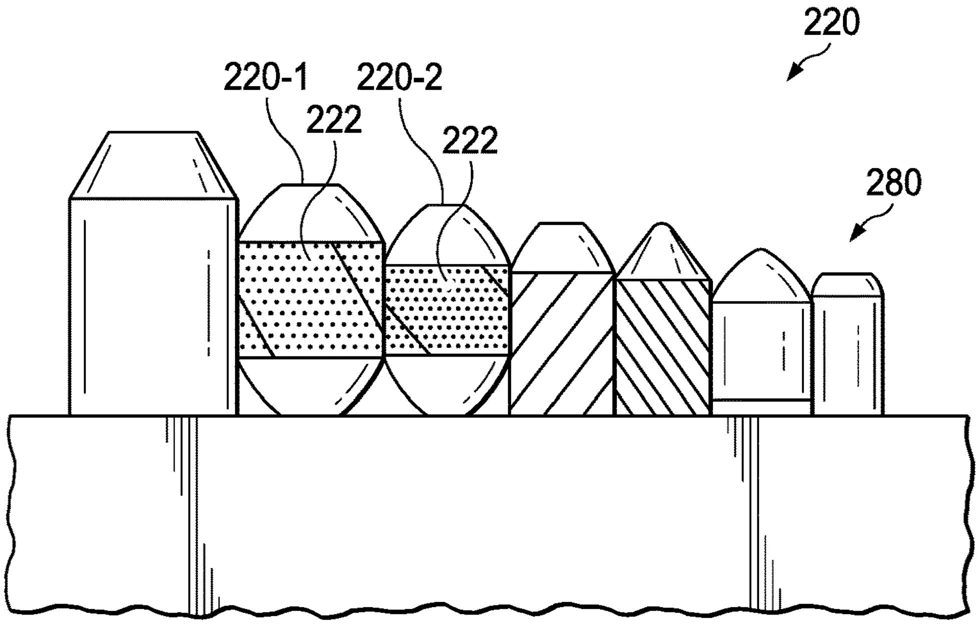
FIG. 2 (PRIOR ART)
FIG. 2 shows example cleaning pigs that can be used in embodiments of the present disclosure.
Figures 2, 4:
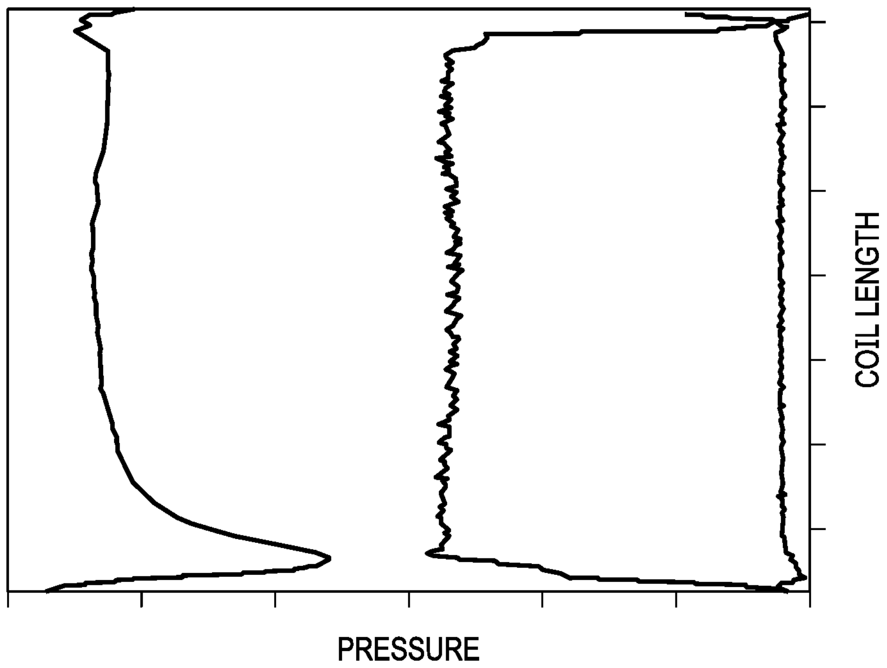
Figures 1, 4:
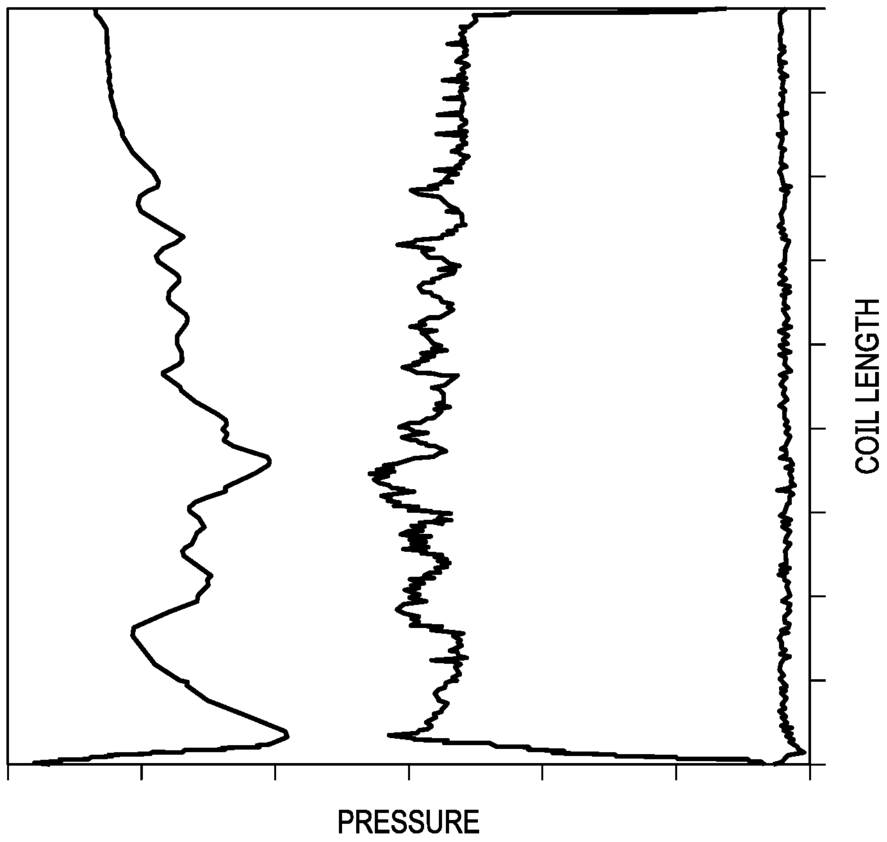

Example data from the decoking truck 310 is shown in FIG. 4-1 and FIG. 4-2. At the beginning of cleaning coils 340, dirty or fouled coils 340 caused by coke in the coils 340 results in large pressure differences as the cleaning pig 320 is pumped through the coils 340, as shown in FIG. 4-1. At the end of the cleaning process of the coils 340, the coils 340 have been cleaned and there are hardly any, or small pressure spikes as the cleaning pig 320 is pumped through coils 340, as shown in FIG. 4-2. At the end of the cleaning process of the coils 340, small pressure spikes are caused by bends in the coils 340.

Prior art trucks have analog (non-intelligent) instrumentation. By contrast, embodiments of the decoking truck 310, also referred to as a "smart" truck, of the present disclosure have digitally enabled instrumentation that provides information such as that shown in FIG. 5 and FIG. 6.

Figure 5:
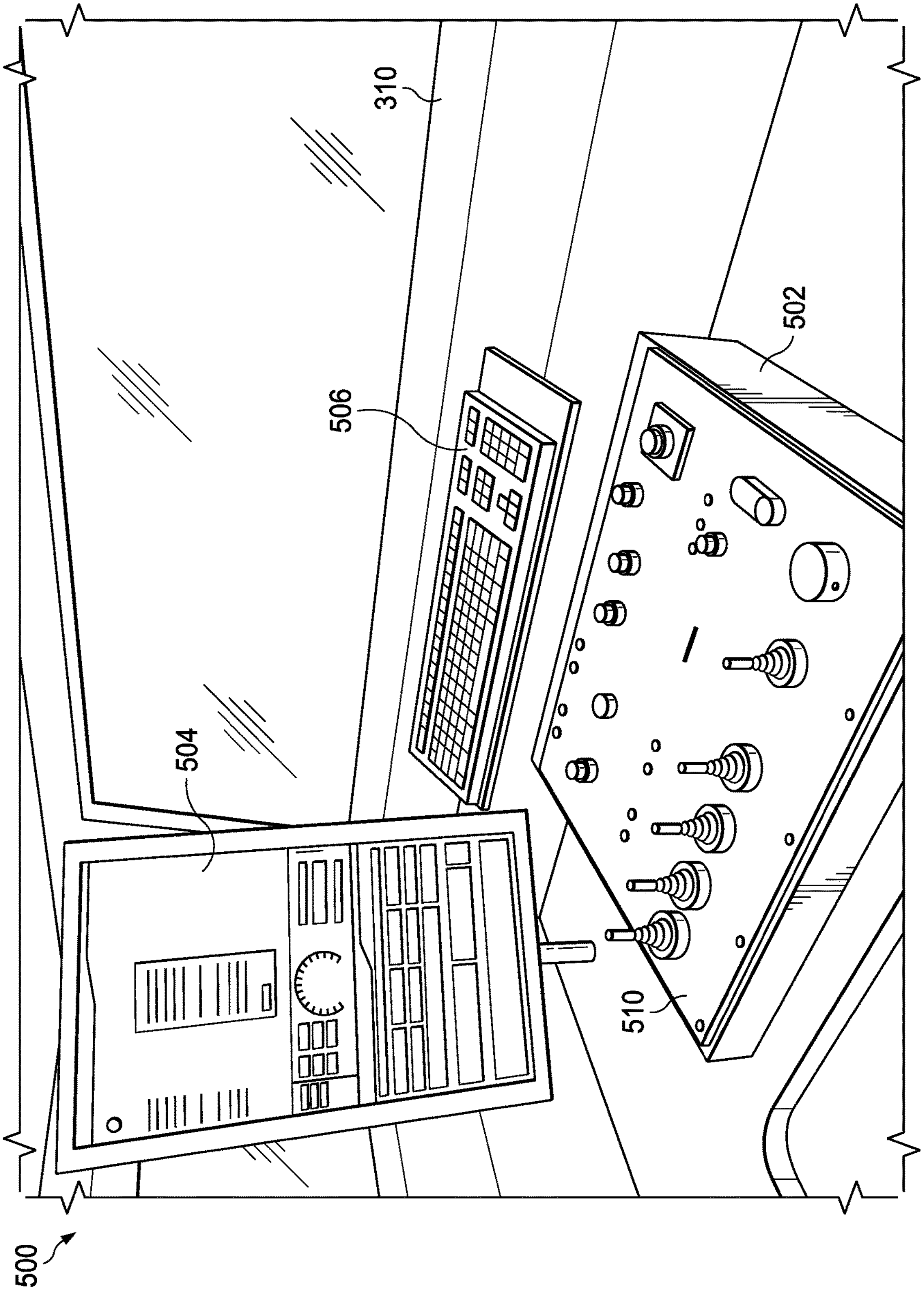
FIG. 5 shows digitally enabled instrumentation in an embodiment of the decoking truck of the present disclosure.

Referring to FIG. 5, the decoking truck 310 includes a control system 500 for performing and controlling cleaning methods and embodiments of this disclosure. The control system 500 includes a computer 502, computer display 504, computer input device 506, and instrumentation panel 510. Computer 502 includes a processor, memory, and non-transitory memory for processing and storing information associated with the embodiments disclosed. The computer display includes an output processor to display and provide real-time cleaning process data.

Figure 6:
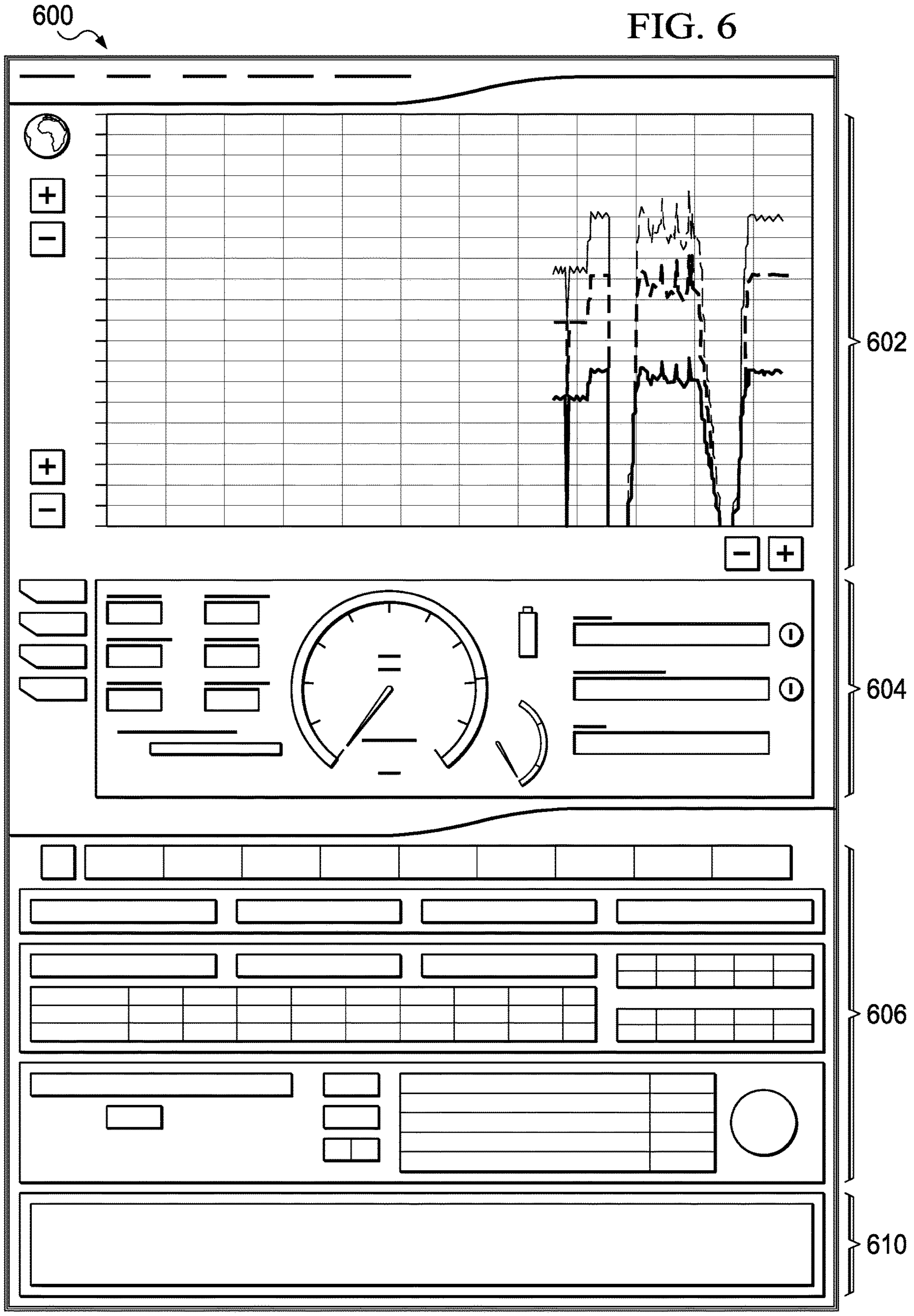
FIG. 6 illustrates types of information available in an embodiment of the decoking truck of the present disclosure.
Figure 7:
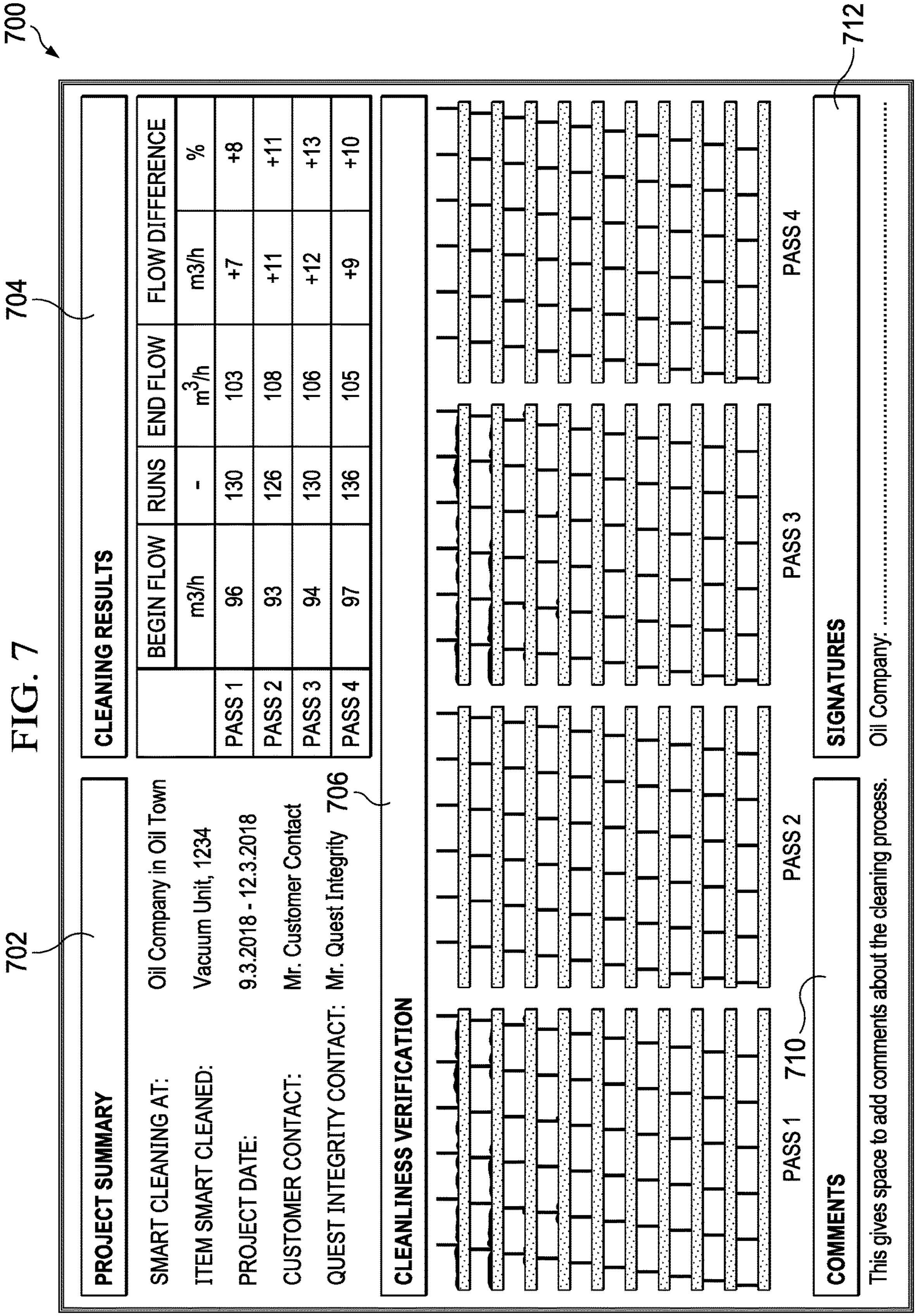
FIG. 7 provides an example cleaning report generated in an embodiment of the present disclosure.

The type of information available in an embodiment of the decoking truck 310 of the present disclosure is illustrated in FIG. 6. As shown in an example screen shot 600 on computer display 504, the information available includes pigging data 602, engine information 604, automatic reporting 606 and feedback comments 610. The automatic reporting 606 can include pigging runs counts and start/end flow record. In some embodiments, additional information is provided by the control system 500 such as pig localization, pig effectiveness calculations, and automatic "smart" cleaning reports (such as shown in FIG. 7).

The "smart" cleaning reports combine the "smart" decoking truck cleaning parameters with the fouling verification. An embodiment of a cleaning report 700 is shown in FIG. 7. Each cleaning report 700 shows an overview of the asset. The cleaning report 700 includes a project summary section 702, a cleaning results section 704, a cleanliness verification section 706, a comments section 710, and a signatures section 712. The cleanliness verification section 706 of the smart cleaning report includes a Line Plot for each coil, each coil may also be referred to as a coil segment, showing the state of the coil after the cleaning process. The cleaning parameters consist of the number of executed cleaning runs as well as the flow reference value measured before and after cleaning.

Embodiments of the decoking trucks 310 of the present disclosure can additionally automatically count pig runs, store packing lists, and store notes from previous jobs.

Figures 1, 8:
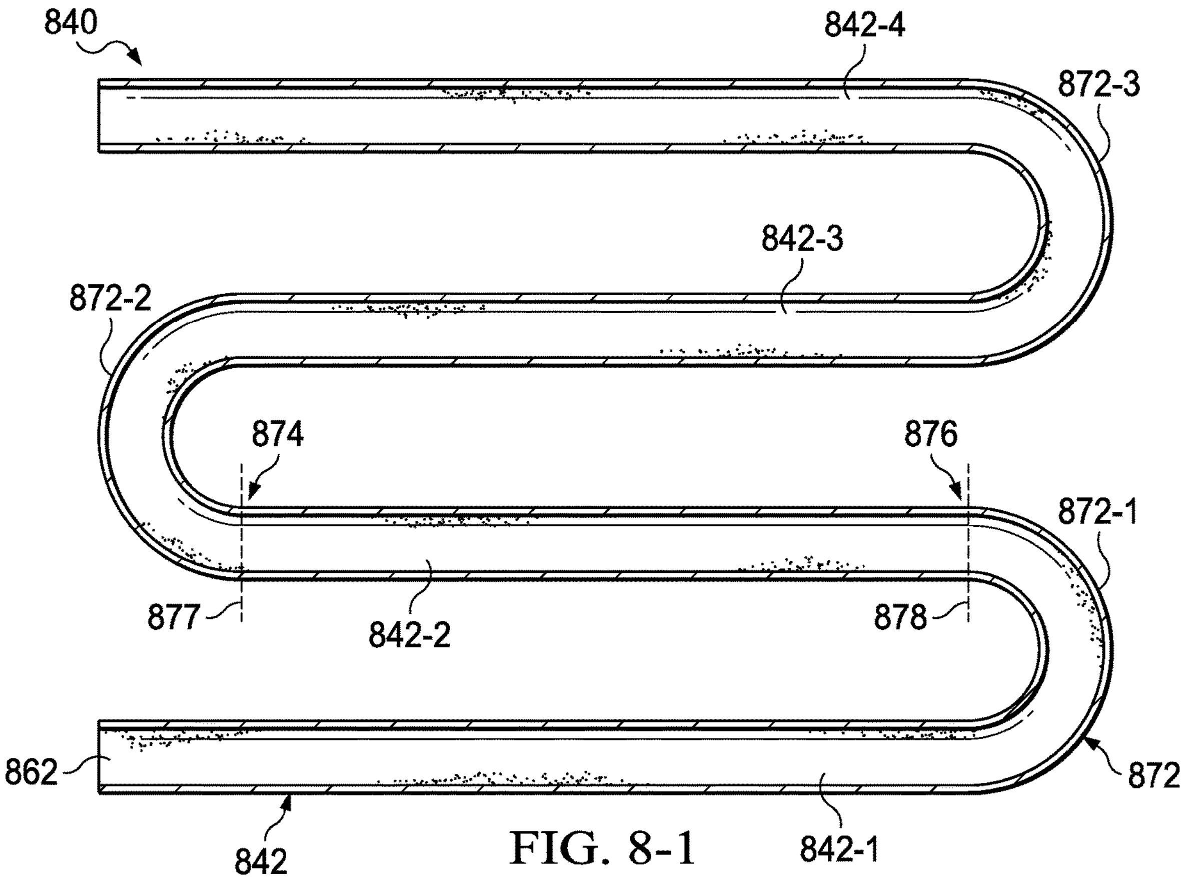
Figures 2, 8:
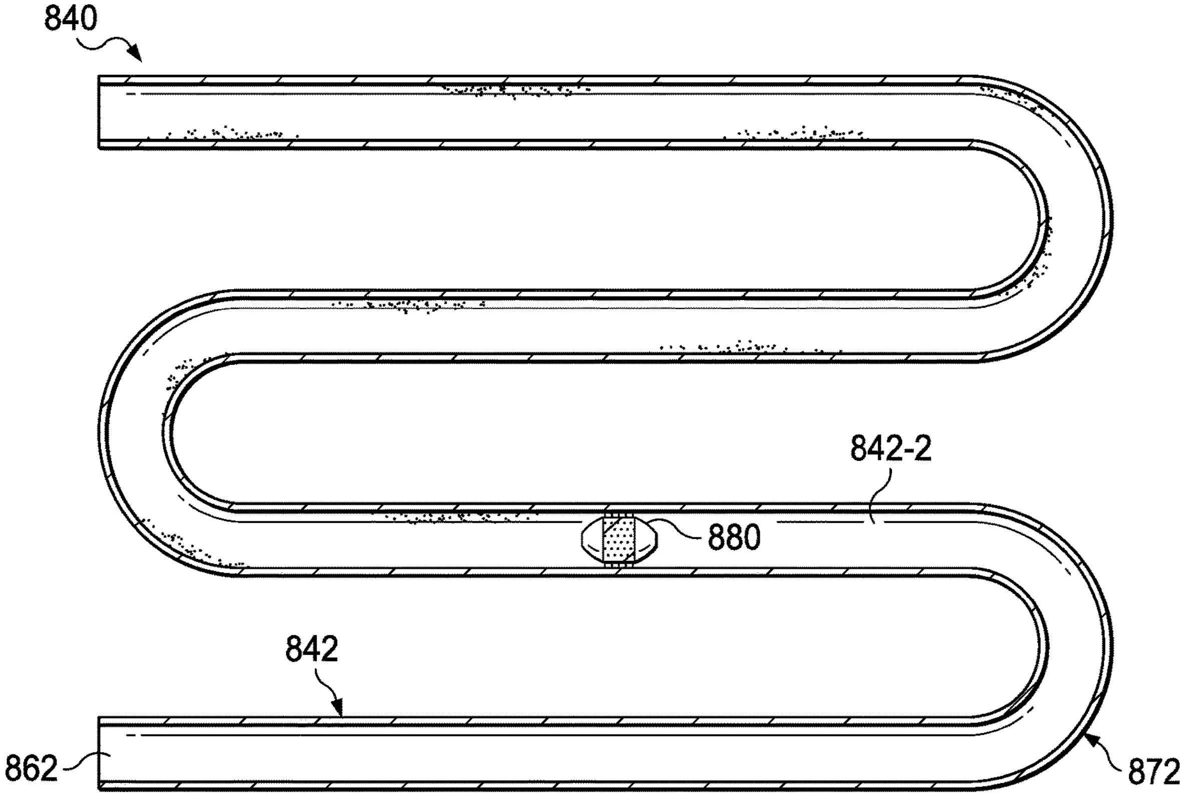
Figures 3, 8:
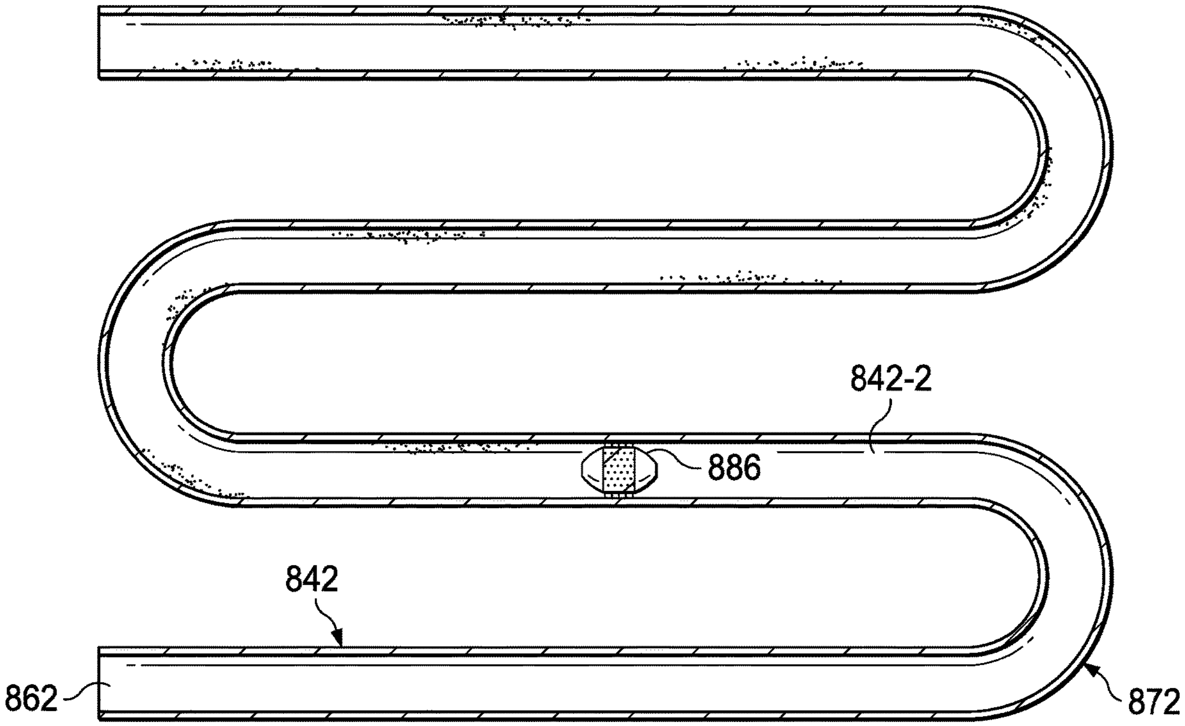
Figures 4, 8:
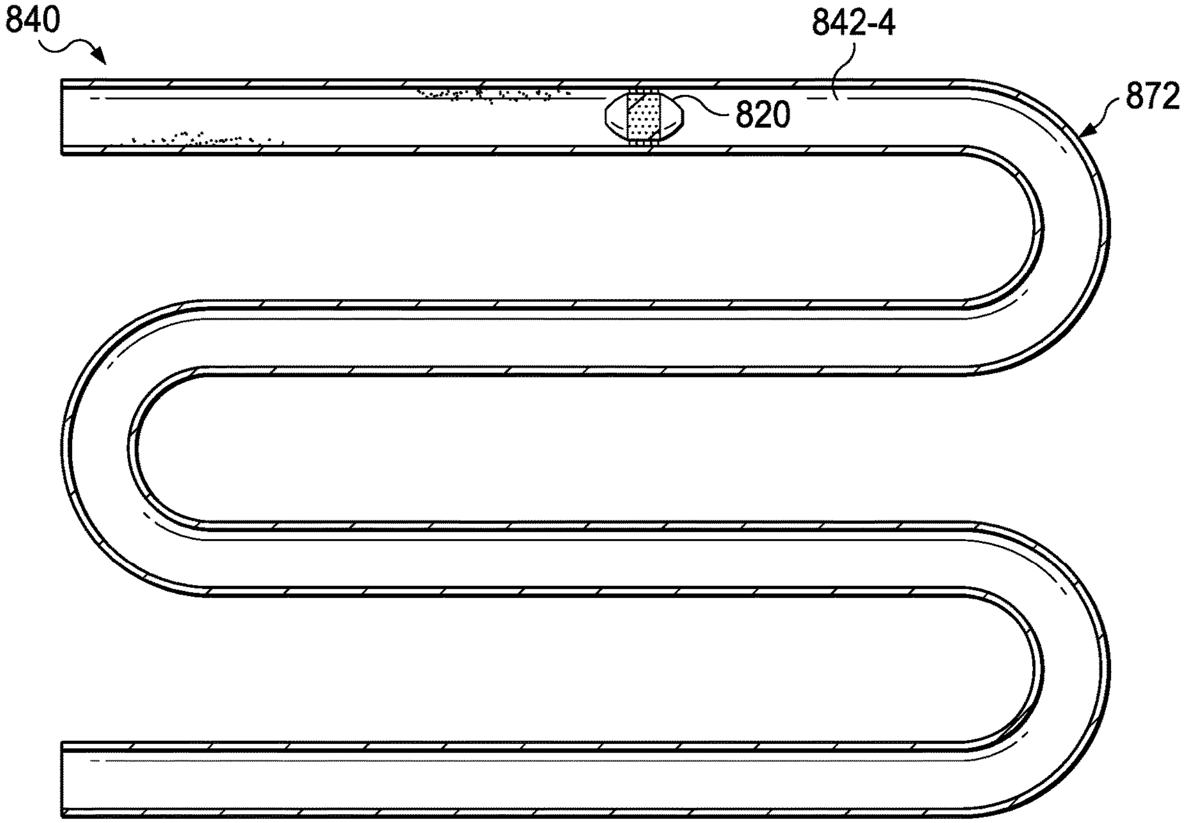
Figures 5, 8:
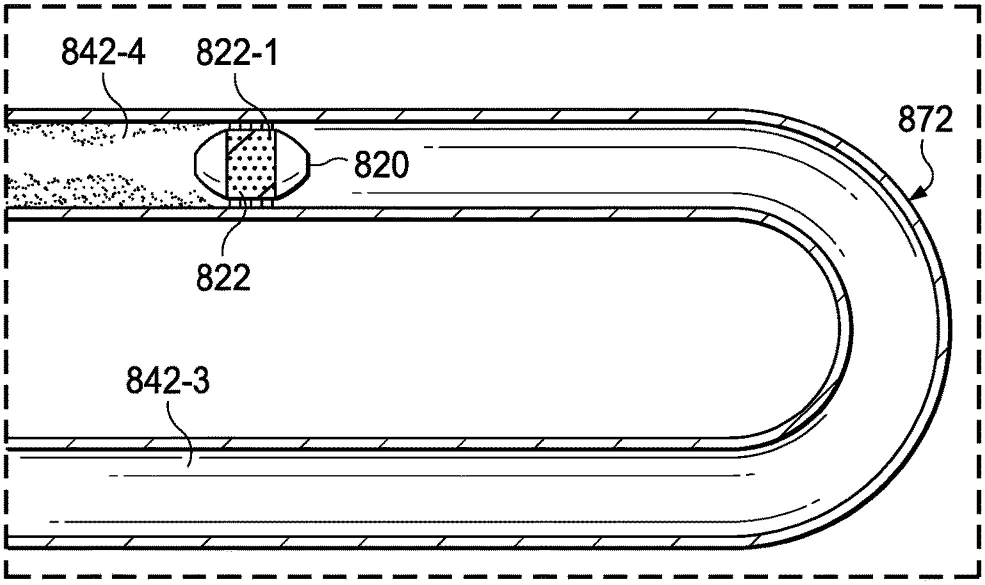

Referring to FIGS. 8-1 to 8-5, a sequence of stages during a cleaning operation in an embodiment of the present disclosure is shown. FIGS. 8-1 to 8-4 shows a cross-section of coils 840 having four individual coil segments 842, individually numbered as 842-1, 842-2, 842-3, and 842-4. FIG. 8-5 show a cross-section of a portion of coil segment 842-3 and coil segment 842-4. The coils 840 can include different numbers of coil segments 842 and different types depending on the embodiment of the fired heater 350. The coils 840 illustrates a typical serpentine shape of the coils 840.

In the embodiment shown, the coil segments 842 extend in a straight line from one end to the other end. For example, coil segment 842-2 extends from a first coil segment end 874 to a second coil segment end 876, as shown by dotted line 877 and 878 on coil segment 842-2. As shown in FIGS. 8-1 to 8-4, three coil bends 872 connect coil segments 842 to one another end to end. Coil bends 872 are individually numbered as 872-1, 872-2, and 872-3. Coil bend 872-1 connects coil segment 842-1 and 842-2, coil bend 872-2 connects coil segment 842-2 and coil segment 842-3, and coil bend 872-3 connects coil segment 842-3 and coil segment 842-4. In other embodiments, coils 840 can have different shapes and types. The coils 840 may be radiation coils or convection coils of fired heater 350. The cross-section of coils 840 shows the internal surface 862 of the coil segments 842. The cleaning method illustrated in FIGS. 8-1 to 8-5 may use the cleaning system 300 illustrated in FIG. 3.

The decoking truck 310 is coupled to the fired heater 350 with fluid conduits 330 to begin a cleaning operation of the coils 840. In some of the embodiments, the decoking truck 310 stays on-site during the cleaning operation shown in FIGS. 8-1 to 8-5. The decoking truck 310 is used to fill the coils 340 of the fired heater 350 with water or other liquid and a fluid circuit is formed including the decoking truck 310, fluid conduits 330, and coils 340 to allow for fluid flow though the coils 340 via the fluid circuit. A starting flow test of the coils 340 can be performed using the fluid circuit. The decoking truck 310 pumps water through the coils 840 for the flow test to establish a starting flow rate through the coils 840 before cleaning of the coils 840 with cleaning pig 320. Additional flow tests can be performed at the end of each stage of the cleaning operation.

After the flow test, in some embodiments, a tracer pig stage of the cleaning operation is performed. Referring to FIG. 8-2, a tracer pig 880 is launched by decoking truck 310 and is shown in coil segment 840-2. The tracer pig 880 has an outer surface, and in some embodiments is made of a high-density foam with the outer surface formed by the high-density foam. The tracer pig 880 can be driven back and forth within a selected coil segment 842. After the tracer pig 880 has travelled through the coils 340 from one end to the other at least one time, the tracer pig 880 is removed from coils 840 via the pig receiver 345 shown in FIG. 3. In some embodiments, the tracer pig 880 may have multiple trips or runs through the coils 340 from end to end before being removed from the coils 840. In some embodiments, cleaning pigs 220, shown in FIG. 2, may be used as a tracer in the tracer pig stage.

The tracer pig 880 is used to detect any obstacles in a coil section 840 of the coils 340, for example thermos welds or orifices that have been left in place in the coils 340. The tracer pig 880 also may be used to push through the coils 340 and remove any loose debris and fouling contaminants. The loose debris and fouling contaminants are removed from the coils 340 using the decoking truck 310. For example, the decoking truck 310 measures and determines fluid pressure and fluid flow in the coils 840 as the decoking truck 310 pumps the tracer pig 880 through the coils 340. In some embodiments, the tracer pig 880 is sized to be less than the internal diameter of the coil segments 842 to allow the tracer pig 880 to pass through coils segments 842 that may have fouling deposits on internal surface 862. In some embodiments, the tracer pig 880 is sized to have the same outer diameter as the data acquisition tool 886, shown in FIG. 8-3. The decoking truck 310 also can measure and determine multiple parameters, including flow rate and flow pressure, when running the tracer pig in the coils 340. This tracer information may be used to determine whether the coils 340 are sufficiently free from internal obstructions to allow a data acquisition tool 886, shown in FIG. 8-3, to pass through the coils 340.

The tracer pig 880 is run through the coils 340 to ensure that there is a minimum data acquisition tool clearance in the coils 340 for the data acquisition tool 886 to pass through the coils 340 without being damaged. The tracer pig stage of the cleaning operation is performed to establish a pathway through the coils 340 for the data acquisition tool 886 to prevent damage to the data acquisition tool 886 or other inspection tool run through the coils 340 after the tracer pig stage. The tracer pig 880 typically has a harder body compared to the data acquisition tool 886. For example, the tracer pig 880 may be of a higher durometer polyurethane compared to a data acquisition tool 886 having a body made with a softer durometer polyurethane material or other softer material. Accordingly, the tracer pig 880 may clear a pathway through the coils 340 without sustaining substantial damage. The data acquisition tool 886 and other inspection tools run through the coils 340 are typically more expensive or more susceptible to damage compared to tracer pigs 880.

The tracer pig 880 may also give an indication about the degree of fouling in the coils 340. For example, the tracer pig 880 will show signs of friction damage when the coils 340 are heavily fouled or polluted. This friction damage to the tracer pig 880 may be caused by fouling and contamination deposits in the coils 340, for example, coke deposits on the internal surface 862 of coils 340.

Referring to FIG. 8-3, in some embodiments of the cleaning operation, after the starting flow test and tracer pig stage, a data acquisition stage is performed. During the data acquisition stage, a data acquisition tool 886 is launched and is shown in coils 840. In some embodiments, the data acquisition tool 886 is run before the tracer pig 880 runs through the coils 340. Data acquisition tool 886 is shown in coil segment 842-2. The data acquisition tool 886 may be launched via the pig receiver 345 for inserting the data acquisition tool 886 into coils 340. The data acquisition tool 886 is used to acquire data that can be used to determine fouling on the internal surface 862 of coils 840. The data acquisition tool 886 may include acoustic technology with sensors and receivers for use in acquiring baseline data corresponding to fouling deposited on the internal surface 862. The decoking truck 310 is used to pump the data acquisition tool 886 through the coils 340 from end to end in this embodiment. In some embodiments, the data acquisition tool 886 may have multiple runs through the coils 840 during the data acquisition stage.

The data acquisition tool 886 is removed from the coils 340 after acquiring data during the run or runs through the coils 840. The data acquisition tool 886 may be removed from the coils 340 via the pig receiver 345, shown in FIG.

3. In some embodiments, the data from the data acquisition tool 886 is stored in a tool memory in the data acquisition tool 886. After the data acquisition tool 886 is removed from the coils 840, the data in the tool memory is loaded onto a non-transitory memory. For example, the non-transitory memory may be part of computer 502 on the decoking truck 310. In other embodiments of the data acquisition device 886, the data may be transmitted to computer 502 of the decoking truck 310 while the data acquisition tool 886 is in the coils segment 840, for example by using a tether attached to the data acquisition tool 886 and the decoking truck 310.

After the data acquisition stage, a data processing stage is performed to process the data acquired in the acquisition stage. In some embodiments, computer 502 in the decoking truck 310 is used to process the data acquired by the data acquisition tool 886 to establish a pre-cleaning fouling baseline. The pre-cleaning fouling baseline identifies the location of areas of fouling, referred to as fouling areas, in the coils 340, including locations in coil segments 842. There may be multiple fouling areas in a single coil segment 842 in the pre-cleaning fouling baseline. In some embodiments, the pre-cleaning fouling baseline identifies specific coil segments 842 that have at least one fouling area and specific coil segments 842 that have no fouling area.

An optimized cleaning plan is developed based on the pre-cleaning fouling baseline during the data processing stage. The optimized cleaning plan includes instructions to the decoking operator on how to perform cleaning of the coils 840 with at least one cleaning pig 820, shown in FIG. 8-4 and FIG. 8-5. More specifically, the optimized cleaning plan provides instructions to the decoking operator to selectively clean one or more fouling areas identified in the pre-cleaning fouling baseline. Because the cleaning of the coils 840 with the cleaning pig 820 is performed based on the optimized cleaning plan, the consistency and quality of the cleaning operation is improved. The cleaning operation is less dependent on the experience of the decoking operator and is more predictable. In other words, the automation of the cleaning operation is increased through use of the optimized cleaning plan, and the owner of the fired heater 350 can gain more visibility and control of the cleaning operation. As described further below and shown in FIG. 9, the pre-cleaning baseline and the optimized cleaning plan may be used by the decoking operator during a focused cleaning stage directed to cleaning the fouling areas in the coils 340.

Referring to FIG. 8-4 and FIG. 8-5, after the data acquisition stage and data processing stage, a focused cleaning stage is performed with at least one cleaning pig 820 based on the optimized cleaning plan. The cleaning pig 820 is launched into the coils 840 by inserting the cleaning pig 820 into the pig receiver 345 shown in FIG. 3. The decoking truck 310 pumps the cleaning pig 820 through the coils 840 and monitors the location of the cleaning pig 820 in real-time. The decoking truck 310 establishes the location of the cleaning pig 820 during cleaning the coils 840 in real-time so that the decoking truck can drive the cleaning pig 820 to perform the focused cleaning for the fouling areas to be cleaned.

The optimized cleaning plan can instruct a type of focused cleaning based on the quantity of fouling in the coils 840 from the pre-cleaning fouling baseline. In some embodiments, the optimized cleaning plan can instruct the selection of the type of the at least one cleaning pig 820 to be used to perform the focused cleaning based on the quantity of fouling. For example, the optimized cleaning plan can select for the focused cleaning the size of the cleaning pig 820 or type of abrasive outer surface of the cleaning pig 820 based on quantity of fouling in the coils 840. In another embodiment, the number of runs for a fouling area performed by the cleaning pig 820 can be selected based on the quantity of fouling.

Referring to FIG. 8-5, showing a cross-section of a portion of coil segment 842-3 and coil segment 842-4, cleaning pig 820 is shown being pumped through coil segment 842-4 during the focused cleaning stage. The cleaning pig 820, also commonly referred to as a decoking pig or scraper pig, has an abrasive outer surface 822 to enable the focused cleaning of the fouling areas to be cleaned. In the embodiment shown in FIG. 8-5, the abrasive outer surface 822 includes studs 822-1, sometimes referred to as protrusions, as part of the abrasive surface 822. The studs 822-1 extend outwards from the cleaning pig 820. In some embodiments, the studs 822-1 are made of metal. In other embodiments, the studs 822-1 are made of non-metallic materials. The cleaning pig 820 and the abrasive outer surface 822 are configured to scrape fouling contaminants, such as coke, from the interior of the coil segment 842-4. The cleaning pig 820 can be under-sized, line-sized, or oversized for the coil segments 842-4. The cleaning pig 820 shown in FIG. 8-5 depicts a cleaning pig 820 that is line-sized.

During the focused cleaning stage, focused cleaning is provided for fouling areas identified in the precleaning fouling baseline and selected for focused cleaning in the optimized cleaning plan. In some embodiments, the focused cleaning of the one or more fouling areas selected for cleaning is cleaned by running the cleaning pig 820 a plurality of times in the selected one or more fouling areas to remove fouling from the selected fouling areas. For example, if a fouling area in coils segment 842-4 is selected for focused cleaning, the cleaning pig 820 can be run back and forth within the coil segment 842-4 multiple times to provide for focused cleaning of coil segment 842-3. The selected number of runs in coil segment 842-4 to clean the fouling area in coil segment 842-4 may be selected by the optimized cleaning plan. The cleaning runs in coil segment 842-4 may be from a first end 881 to a second end 883 of coil segment 842-3. The cleaning runs in coil segment 842-3 may be focused on a portion of the length of coil segment 842-3 corresponding to the location and length of the fouling area being cleaned.

In some embodiments, the pre-cleaning fouling baseline identifies the quantity of fouling for a fouling area. For example, the quantity of fouling for a fouling area may be quantified as a fouling radial thickness extending from the internal wall 862 of the coils 840. The quantity of fouling for a fouling area may also be quantified as a fouling length along a longitudinal axis 884 of the coil segments 842 having the fouling area. The coil segment 842-1 depicts a longitudinal axis 884. The quantity of fouling for a fouling area may also be quantified by a combination of fouling radial thickness, fouling axial length, and fouling circumferential width.

The optimized cleaning plan can instruct a focused cleaning based on the quantity of fouling from the pre-cleaning fouling baseline. In some embodiments, the optimized cleaning plan could instruct a focused cleaning for a fouling area having at least a selected quantity of fouling and to not provide a focused cleaning for a fouling area having less than a selected quantity of fouling. For example, the optimized cleaning plan could instruct a focused cleaning for a fouling area having at least a selected fouling radial thickness, at least a selected fouling length, or a combination of fouling quantity parameters; and to not provide a focused cleaning for a fouling area having less than at least a selected fouling radial thickness, at least a selected fouling length, or a combination of fouling quantity parameters.

The stage in the cleaning operation that the pre-cleaning fouling baseline is determined provides benefits. In some embodiments, the pre-cleaning fouling baseline for the cleaning operation is established for the coils 840 before cleaning the coils 840 with the cleaning pig 820. At this early stage, the coils 840 have not been mechanically scraped by a cleaning pig 820 that has been run through the coils 840 during the cleaning operation to remove fouling deposits. The data acquisition tool 886, shown in FIG. 8-3, is run through the coils 840 prior to running the cleaning pig 820 through the coils 840. As discussed previously, in some embodiments a tracer pig 880 previously may have been run through the coils 840 prior to running the data acquisition tool 886. At this early stage of the cleaning operation, the information from the pre-cleaning fouling baseline, including the location of fouling areas and the quantity of fouling, can be used to gain insights into the refining process and to adjust the refining process to optimize asset efficiency. In contrast, a fouling baseline taken at a later stage of the cleaning operation, specifically after running the cleaning pig 820, may not provide as much information on the fouling because the cleaning pig 820 may have removed significant fouling from the coils 840.

In an alternative embodiment, cleaning pig 820 can be run through the coils 840 using the decoking truck 310 before the data acquisition tool 886 (shown in FIG. 8-3) is run through the coils 840. Tracer pig 880 can also be run prior to running the cleaning pig 820, as described above. Before the data acquisition tool 886 is run, the cleaning pig 820 is run through the coils to ensure that no remaining obstructions or large loose pieces of fouling remain in the coils 840 that could prevent safe passage of the data acquisition tool 886 though the coils 840. In this alternative embodiment, the cleaning pig 820 is selected to ensure that no remaining obstructions exist, or large, loose pieces of fouling exist in the coils 840 that could prevent safe passage of data acquisition tool 886. After running the cleaning pig 820 and removing cleaning pig 820 from the coils 840, the cleaning operation continues as shown and described with respect to FIGS. 8-3 through 8-5.

Figure 9:
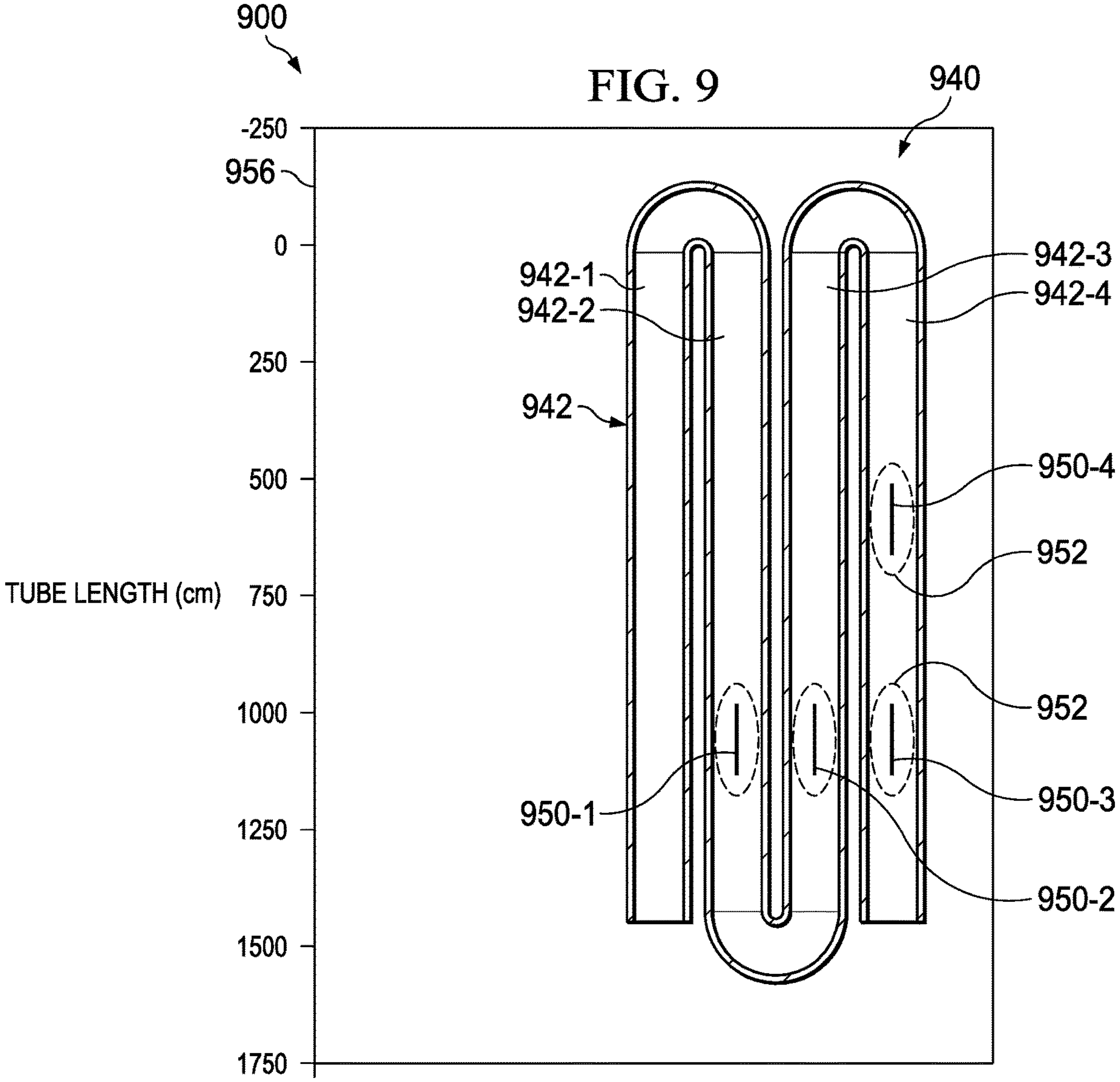
FIG. 9 illustrates a cleanliness verification chart showing the location of fouling areas in a cross-sectional view of the coils for use in a pre-cleaning fouling baseline and an optimized cleaning plan in an embodiment of the present disclosure.

Referring to FIG. 9, a cleanliness verification chart 900 based on the data from running the data acquisition tool 886 during the acquisition stage is shown. The information in the cleanliness verification chart 900 can be part of the pre-cleaning fouling baseline and the optimized cleaning plan. The cleanliness verification chart 900 shows coils 940 with four coil segments 942, and each coil segment 942 individually numbered with numerals 942-1 to 942-4. The coil segments 942 show information from an example pre-cleaning fouling baseline regarding the coil segments 942.

The cleanliness verification chart 900 shows representations of the fouling areas in the coil segments 942. The cleanliness verification chart 900 has a vertical axis 956 titled, "Coil Segment Length centimeters." A decoking operator performing the cleaning operation can use the cleanliness verification chart 900 to easily identify coil segments 942 that have fouling areas 950 shown in coil segment 942-2, coil segment 942-3, and coil segment 942-4. Coil segment 942-1 does not show a fouling area 950. The coil segment 942-2 has a fouling area 950-1. The coil segment 942-3 has a fouling area 950-2. The coil segment 942-4 has a fouling area 950-3 and a fouling area 950-4.

The cleanliness chart 900 identifies the fouling areas for focused cleaning by highlighting the one or more fouling areas 950 for focused cleaning with cleaning designators 952. The cleaning designators 952 shown are dashed circles. Other cleaning designators 952 such as color highlights may be used in different embodiments.

The cleanliness verification chart 900 can be used as part of the optimized cleaning plan to direct the decoking operator in performing the cleaning operation. In some embodiments, the optimized cleaning plan can instruct the decoking operator to clean the coil segments 942 having fouling areas 950 and to not clean coil segments 942 that do not have fouling areas 950. The optimized cleaning plan can effectively communicate the coil segments for focused cleaning with cleaning designators 952. For example, the optimized cleaning plan could instruct the decoking operator to clean the three coil segments 942-2, 942-3, and 942-4 that have fouling areas 950-1, 950-2, 950-3, and 950-4; and to not clean the one coil segment 942-1 that does not have a fouling area 950. The cleaning designators 952 can be used in the optimized cleaning plan to highlight to the decoking operator to only clean the coil segments 942 with a fouling area 950 that have at least one cleaning designator 952 marking a fouling area 950.

In some embodiments, the optimized cleaning plan can instruct the decoking operator to only clean in areas proximate to one or more of the fouling areas 950. For example, the optimized cleaning plan can instruct the decoking operator to only clean the fouling area 950-1 in the coil segment 942-2, and not the entire coil segment 942-2. The cleaning instructions for fouling area 950-1 can include an instruction to clean between 1000 centimeters (cm) and 1250 centimeters (cm) where the cleanliness verification chart 900 in FIG. 9 shows the approximate location of the fouling area 950-1 via the vertical axis 956 of the cleanliness verification chart 900. This localized cleaning of the coil segment 942-2 directed to the specific fouling area 950-1 of coil segment 942-2 could help limit any damage to the wall thickness of the coil segment 942-2 during the cleaning operation.

FIG. 9 shows only one fouling area 950-1 in coil segment 942-2. In some embodiments, there can be multiple fouling areas 950 in the coil segment 942-2 and the optimized cleaning plan could instruct that each of the fouling areas to be cleaned proximate each of the fouling areas 950. In this way, it is not necessary to clean the entire length of the coil segment 942-2 when cleaning the coil segment 942-2 based on the optimized cleaning plan.

In some embodiments, the optimized cleaning plan instructs the selection of more than one cleaning pigs 860 and instructs the decoking operator to clean the coils 840 with the selected cleaning pigs 860. For example, in some embodiments the optimized cleaning plan selects an under-sized cleaning pig 860 to be used for focused cleaning during a first pass through the coils 840, and a line-sized cleaning pig 860 or an over-sized cleaning pig 860 to be used for focused cleaning during a second pass. The first pass ends when the under-sized cleaning pig 860 is removed from coils 840 after focused cleaning of coils 840. The second pass ends when the line-sized cleaning pig 860 or over-sized cleaning pig 860 is removed from coils 840 after focused cleaning of coils 840. The under-sized cleaning pig 860 and the under-sized cleaning pig 860 or over-sized cleaning pig 860 can be a mechanically studded. The optimized cleaning plan can instruct the focused cleaning of the fouling areas 950 by the cleaning pig 860 during each pass, including the number of runs for the focused cleaning during each pass. The pre-cleaning fouling baseline and optimized cleaning plan can be updated after a pass of the cleaning pig 860 by running the acquisition tool 886 after a pass with the cleaning pig 860 to re-perform the data acquisition stage. An updated pre-cleaning fouling baseline and optimized cleaning plan can be established and developed for focused cleaning in a subsequent pass with the at least one cleaning pig 860.

As previously discussed with respect to FIG. 7, a post cleaning verification is performed after the focused cleaning. The post cleaning verification can be performed with the data acquisition tool 886 or another inspection tool. In some embodiments, after the post cleaning verification and no additional focused cleaning is to be performed, the cleaning operation can be concluded and the decoking truck 310 can be decoupled from the coils 840 of fired heater 350.

In some embodiments, the information in the cleanliness verification section 706 can be used as part of the pre-cleaning fouling baseline and the optimized cleaning plan. The cleanliness verification section 706 can include data acquired by data acquisition tool 886 during the data acquisition stage. The cleanliness verification section 706 shows the coil segments that have one or more fouling areas. The cleanliness verification section 706 shows a quantify of fouling for coil segments. For example, for the coil segment identified as Rad 5 (referring to radiation coil segment 5) in pass 1 shows a greater quantity of fouling compared to Rad 4 (referring to radiation coil segment 4) in pass 1.

Figure 10:
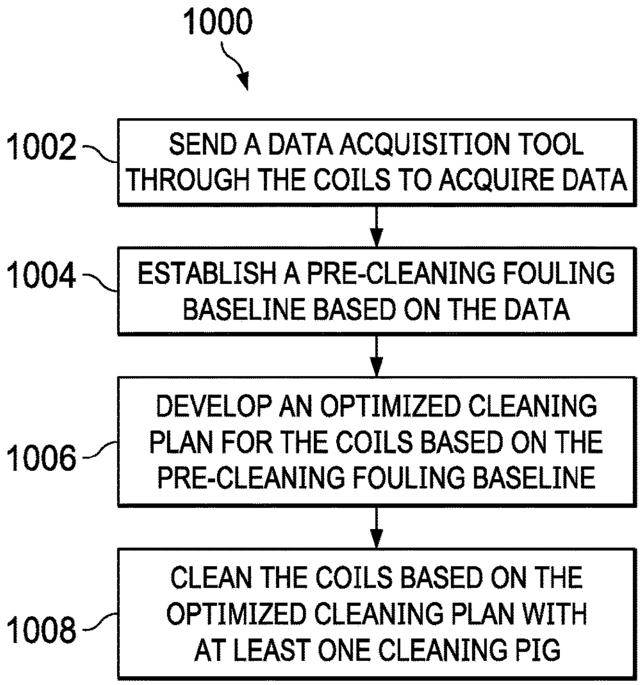
FIG. 10 is a flowchart illustrating an embodiment of a cleaning method of the present disclosure.
Figure 11:
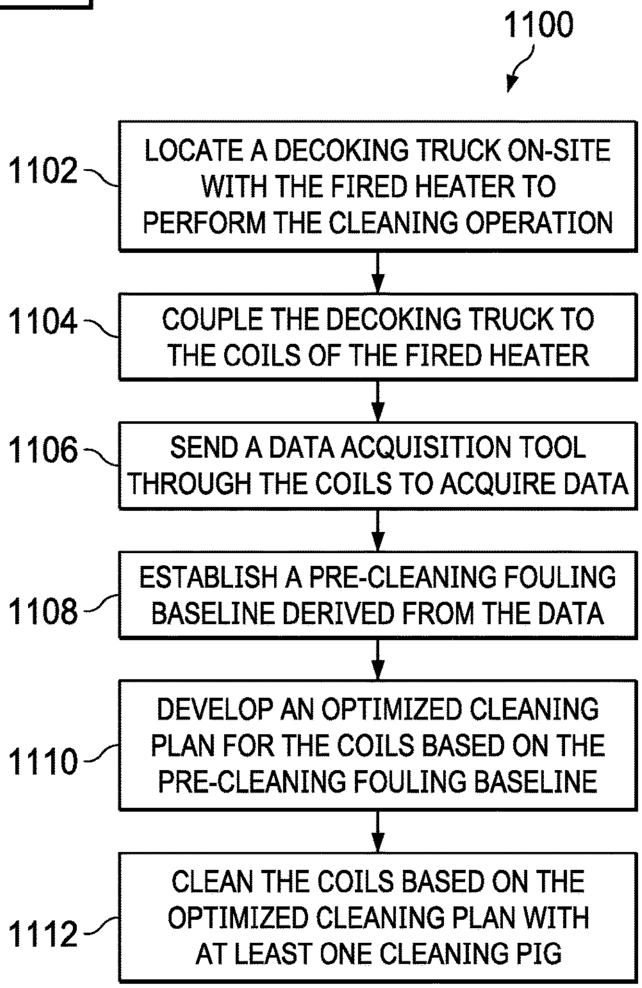
FIG. 11 is a flowchart illustrating an embodiment of a cleaning method of the present disclosure.

FIG. 10 is a flowchart illustrating an embodiment of a cleaning method 1000 of the present disclosure. The cleaning method 1000 begins by sending a data acquisition tool through the coils to acquire data (step 1002). Next, a pre-cleaning fouling baseline is established (step 1004). The pre-cleaning fouling baseline is derived from the data acquired with the data acquisition tool. Establishing the pre-cleaning fouling baseline includes identifying at least one fouling area and establishing a location in the coils for the at least one fouling area. Next, an optimized cleaning plan for the coils is developed based on the pre-cleaning fouling baseline (step 1006). The optimized cleaning plan includes a focused cleaning for the at least one fouling area.

Next, the coils are cleaned based on the optimized cleaning plan with at least one cleaning pig (step 1008). The cleaning with the at least one cleaning pig includes driving the at least one cleaning pig through the coils and performing the focused cleaning on the at least one fouling area with the at least one cleaning pig. The cleaning with the at least one cleaning pig further includes monitoring the location of the at least one cleaning pig within the coils of the fired heater in real-time.

FIG. 1100 is a flowchart illustrating an embodiment of a cleaning method 1100 of the present disclosure. The cleaning method 1100 begins by locating a decoking truck on-site with the fired heater to perform the cleaning operation (step 1102). Next, the decoking truck is coupled to the coils of the fired heater (step 1104). Next, a data acquisition tool is sent through the coils to acquire data (step 1106). Next, a pre-cleaning fouling baseline is established (step 1108). The pre-cleaning fouling baseline is derived from the data acquired by the data acquisition tool. Establishing the pre-cleaning fouling baseline includes identifying at least one fouling area and establishing a location in the coils for the at least one fouling area. Next, an optimized cleaning plan for the coils based on the pre-cleaning fouling baseline is developed (step 1110). The optimized cleaning plan includes a focused cleaning for the at least one fouling area.

Next, the coils are cleaned based on the optimized cleaning plan with at least one cleaning pig (step 1112). The cleaning includes driving the at least one cleaning pig through the coils with the decoking truck and performing the focused cleaning on the at least one fouling area with the at least one cleaning pig. The decoking truck monitors the location of the at least one cleaning pig within the coils of the fired heater in real-time.

Embodiments of the methods and system of the present disclosure provide more effective cleaning of coils of fired heaters. Clean coils allow asset owners to maximize product throughput by running the fired heater at optimal temperatures and pressures, which in turn leads to increased revenues. Left over fouling can restrict the flow of product and act as a heat sink creating potential hot spots. In some cases, where a tube has swelled or bulged, fouling cannot be removed using a mechanical decoking pig without damaging piping upstream or downstream of the deformation. Having specific information about whether the coils are clean or not and where leftover fouling is located before startup helps operators better manage their assets by proactively establishing regular IR monitoring of these locations to prevent unplanned disruptions in service.

Embodiments of the present disclosure are useful to improve the consistency and quality of the cleaning operation, because the cleaning of the coils with the cleaning pig is performed based on the optimized cleaning plan. Embodiments of the present disclosure improve the predictability of the cleaning operation and are less dependent on the experience of the decoking operator through use of the pre-cleaning fouling baseline and optimized cleaning plan. Embodiments of the present disclosure increase the automation of the cleaning operation through use of the optimized cleaning plan to gain more visibility and control of the cleaning. Embodiments of the present disclosure reduce cleaning time by accurately identifying locations of fouling and using the optimized cleaning plan to instruct cleaning in only selected areas. Embodiments of the present disclosure reduce risk of over cleaning, which induces mechanical metal loss from oversized mechanically studded cleaning pigs and thereby consuming asset life. Embodiments of the present disclosure provide the customer with an accurate picture of the state of the furnace both before cleaning coils with cleaning pigs and after cleaning coils with cleaning pigs. Embodiments of the present disclosure are useful to ensure the fired heater furnace is clean and free of all internal fouling, which enables the furnace to run more efficiently during normal operation and prevents accelerated fouling build up—e.g. a small remaining layer of coke will act as a catalyst to actively build coke at an accelerated rate when the furnace is returned to normal operation. Embodiments of the present disclosure monitor the cleaning progress of a fired heaters coils and reduce cleaning time by accurately tracking the location of the cleaning pig and monitoring its cleaning effectiveness.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for cleaning coils in a fired heater, comprising:

sending a data acquisition tool through the coils to acquire data;

establishing a pre-cleaning fouling baseline derived from the data, and wherein establishing the pre-cleaning fouling baseline comprises:

identifying at least one fouling area, and establishing a location in the coils for the at least one fouling area;

developing an optimized cleaning plan for the coils based on the pre-cleaning fouling baseline, and wherein the optimized cleaning plan comprises a focused cleaning for the at least one fouling area; and cleaning the coils based on the optimized cleaning plan with at least one cleaning pig, and wherein the cleaning comprises:

driving the at least one cleaning pig through the coils, performing the focused cleaning on the at least one fouling area with the at least one cleaning pig, and monitoring the location of the at least one cleaning pig within the coils of the fired heater in real-time.

2. The method for cleaning coils of claim 1, further comprising locating a decoking truck on-site with the fired heater, and wherein the decoking truck is used to perform the driving of the at least one cleaning pig through the coils and the monitoring the location of the at least one cleaning pig within the coils of the fired heater in real-time during cleaning the coils.

3. The method for cleaning coils of claim 2, wherein establishing the pre-cleaning fouling baseline further comprises mapping at least one initial fouling location prior to driving the at least one cleaning pig through the coils with the decoking truck during a cleaning operation.

4. The method for cleaning coils of claim 1, wherein the focused cleaning on the at least one fouling area of the optimized cleaning plan comprises selectively cleaning the at least one fouling area based on the pre-cleaning fouling baseline.

5. The method for cleaning coils of claim 1, wherein cleaning the coils based on the optimized cleaning plan is performed with a plurality of cleaning pigs.

6. The method for cleaning coils of claim 1, wherein the coils comprise a plurality of coil segments, and wherein the optimized cleaning plan further comprises:

identifying at least one of the plurality of coil segments as a fouled coil segment;

identifying at least one of the plurality of coil segments as a non-fouled coil segment;

selecting the fouled coil segments for cleaning with the at least one cleaning pig; and selecting the non-fouled coil segments for not cleaning with the at least one cleaning pig.

7. The method for cleaning coils of claim 1, wherein establishing the pre-cleaning fouling baseline further comprises quantifying a fouling amount.

8. The method for cleaning coils of claim 7, wherein the developing an optimized cleaning plan for the coils is based on the fouling amount in the at least one fouling area.

9. The method for cleaning coils of claim 8, wherein the developing an optimized cleaning plan for the coils is based on the location in the coils of the at least one fouling area and the fouling amount in the at least one fouling area.

10. The method for cleaning coils of claim 1, further comprising performing, after cleaning the coils based on the optimized cleaning plan, a cleaning verification of the coils with an inspection tool, and wherein the cleaning verification identifies fouling of coils remaining after cleaning the coils.

11. The method for cleaning coils of claim 10, wherein the coils comprise a plurality of coil segments, and wherein the cleaning verification comprises:

identifying at least one remaining fouling area in the plurality of coil segments after cleaning the coils based on the optimized cleaning plan;

establishing a post-cleaning fouling location for the at least one remaining fouling area; and establishing a remaining fouling quantity for the at least one remaining fouling area.

12. The method for cleaning coils of claim 11, further comprising generating a cleaning report displaying:

a plurality of representative coil segments corresponding to the plurality of coil segments with each of the plurality of representative coil segments individually identified; and at least one fouling representation corresponding to the at least one remaining fouling area and the remaining fouling quantity for the at least one remaining fouling area, and wherein the at least one fouling representation is displayed adjacent to the plurality of representative coil segments to represent the at least one remaining fouling area.

13. A cleaning system for cleaning coils in a fired heater, comprising:

a data acquisition tool configured to pass through the coils to acquire data;

wherein the cleaning system is configured to establish a pre-cleaning fouling baseline derived from the data for the coils, and wherein establishing the pre-cleaning fouling baseline comprises:

identifying at least one fouling area, and establishing a location in the coils for the at least one fouling area;

wherein the cleaning system is configured to develop an optimized cleaning plan for the coils based on the pre-cleaning fouling baseline, and wherein the optimized cleaning plan comprises a focused cleaning for the at least one fouling area;

at least one cleaning pig configured to clean the coils based on the optimized cleaning plan; and a decoking truck for cleaning the coils based on the optimized cleaning plan and configured to drive the at least one cleaning pig through the coils to perform the focused cleaning on the at least one fouling area with the at least one cleaning pig, and to monitor the location of the at least one cleaning pig within the coils of the fired heater in in real-time.

14. The cleaning system for cleaning coils of claim 13, wherein the at least one cleaning pig is a studded cleaning pig.

15. The cleaning system for cleaning coils of claim 13, further comprising an inspection tool for passing through the coils, and wherein the decoking truck is configured to perform, after cleaning the coils based on the optimized cleaning plan with the inspection tool, a cleaning verification of the coils, and wherein the cleaning verification identifies fouling of coils remaining after cleaning the coils.

16. The cleaning system for cleaning coils of claim 15, wherein the decoking truck is configured to generate a cleaning report displaying:

a plurality of representative coil segments corresponding to the plurality of coil segments with each of the plurality of representative coil segments individually identified; and at least one fouling representation corresponding to the at least one remaining fouling area and the remaining fouling quantity for the at least one remaining fouling area, and wherein the at least one fouling representation is displayed adjacent to the plurality of representative coil segments to represent the at least one remaining fouling area.

17. A method for cleaning coils in a fired heater in a cleaning operation, comprising:

locating a decoking truck on-site with the fired heater to perform the cleaning operation;

coupling the decoking truck to the coils of the fired heater;

sending a data acquisition tool through the coils to acquire data;

establishing a pre-cleaning fouling baseline derived from the data, and wherein establishing the pre-cleaning fouling baseline comprises:

identifying at least one fouling area, and establishing a location in the coils for the at least one fouling area;

developing an optimized cleaning plan for the coils based on the pre-cleaning fouling baseline, and wherein the optimized cleaning plan comprises a focused cleaning for the at least one fouling area; and cleaning the coils based on the optimized cleaning plan with at least one cleaning pig, and wherein the cleaning comprises:

driving the at least one cleaning pig through the coils with the decoking truck, performing the focused cleaning on the at least one fouling area with the at least one cleaning pig, and monitoring with the decoking truck the location of the at least one cleaning pig within the coils of the fired heater in real-time.

18. The method for cleaning coils of claim 17, wherein establishing the pre-cleaning fouling baseline further comprises mapping at least one initial fouling location prior to driving the at least one cleaning pig through the coils with the decoking truck during the cleaning operation.

19. The method for cleaning coils of claim 17, wherein the focused cleaning on the at least one fouling area of the optimized cleaning plan comprises selectively cleaning the at least one fouling area based on the pre-cleaning fouling baseline.

20. The method for cleaning coils of claim 17, wherein the coils comprise a plurality of coil segments, and wherein the optimized cleaning plan further comprises:

identifying at least one the plurality of coil segments as a fouled coil segment;

identifying at least one of the plurality of coil segments as a non-fouled coil segment;

selecting the fouled coil segments for cleaning with the at least one cleaning pig; and selecting the non-fouled coil segments for not cleaning with the at least one cleaning pig.

* * * * *